United States Patent Office.

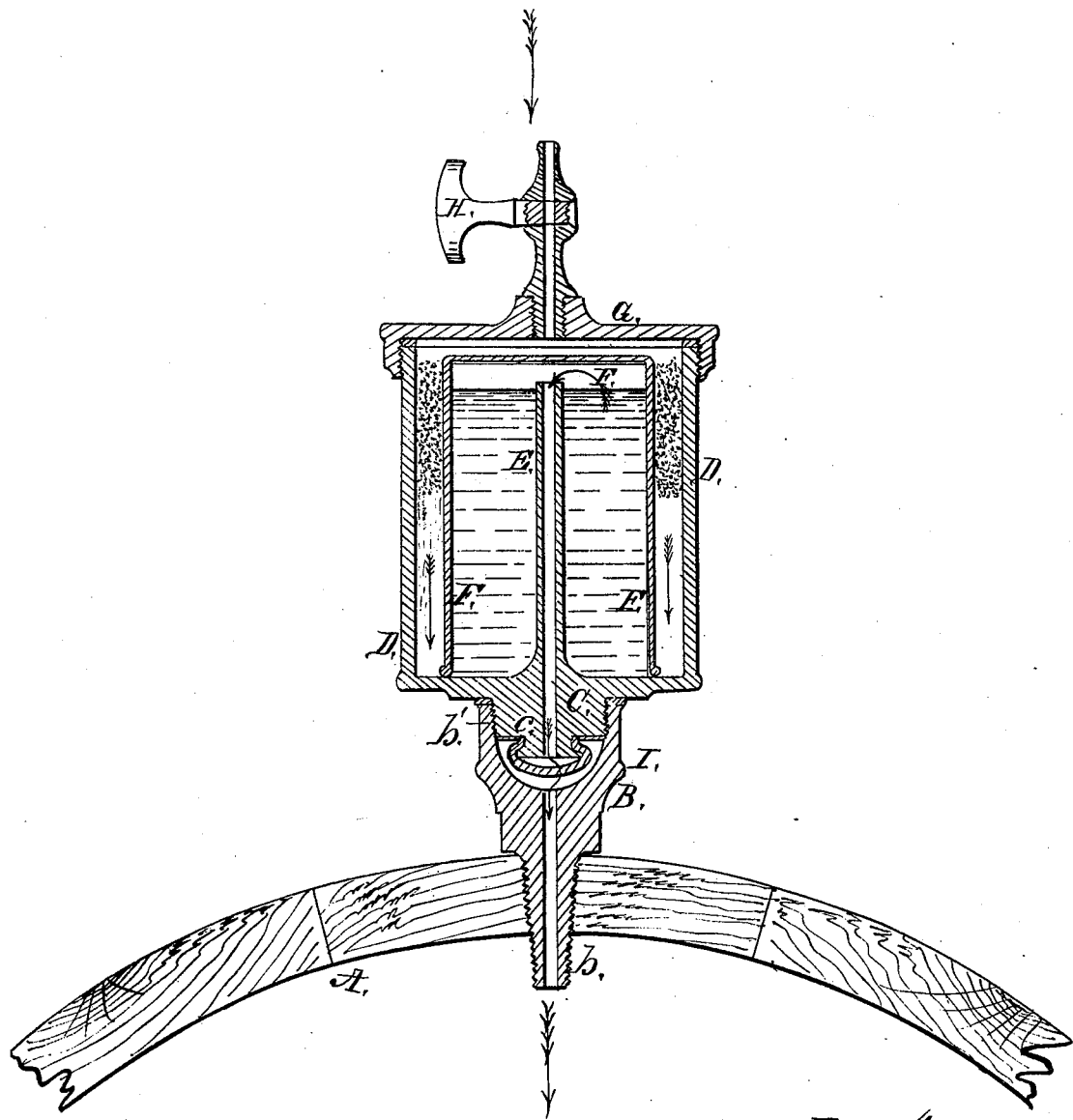

JOHN G. CULLMANN, OF CINCINNATI, OHIO.

Letters Patent No. 91,092, dated June 8, 1869.

IMPROVED DEVICE TO PREVENT INJURY TO LIQUOR ON TAP.

The Schedule referred to in these Letters Patent and making part of the same.

*To whom it may concern:*

Be it known that I, JOHN G. CULLMANN, of Cincinnati, Hamilton county, Ohio, have invented a new and useful Device to Prevent Injury to Liquor "on Tap;" and I hereby declare the following to be a full, clear, and exact description thereof, reference being had to the accompanying drawing, making part of this specification.

The first part of my invention consists in a provision whereby the air which enters to supply the void created by draught is compelled to traverse a body of alcohol, or other purifying-liquid or material.

The second part of my invention consists of an arrangement of mechanical devices for effecting the results above recited.

The souring of beer, wine, milk, &c., on exposure to the air, is well known to depend, in part, on the presence of protophytic sporules, mechanically suspended in the air, and if this mixture of extraneous matter could be prevented, the liquid would not be liable to become sour, and thus depreciated in quality.

To devise means and measures whereby this result might be achieved, many efforts and experiments have been made, but so far without accomplishing the purpose; for it was invariably found to be a fact, that, even if the opening through which the air entered was ever so small, the impure matter contained in the air would communicate with the liquid.

By the arrangement of devices now proposed by me, the air can be freed of all deleterious matters, and while the admixture of any such matters with the liquid is prevented, there is at the same time the necessary protection against the escapement of the carbonic acid, and other gaseous emanations of fermentation.

The accompanying drawing is an axial section of my purifying-chamber in position.

A may represent the upper part of a cask of liquor, on tap or draught.

B is a tube, having a taper-screw stem, $b$, to screw into the cask, and whose upper part, $b'$, is screw-threaded interiorly to receive the screw-threaded neck C, at bottom of the cup D.

The said neck has a central orifice, $c$, which communicates with a stand-pipe, E, that rises nearly to the top of the cup D.

A cup or chamber, F, surrounded with cotton or other floculent or porous substance, is inserted over the stand-pipe E, within the cup D, and the whole is enclosed or shut in by a screw-cap, G, having a small stop or ventilating-cock, H.

A valve, I, at the bottom of the neck C, permits the entrance of air from the cup whenever the interior pressure is reduced below that of the atmosphere, but prevents the escape of air or gas from the cask.

The operation is as follows:

The cap G being removed, alcohol or other purifying-liquid is poured into the cup F, and the cup D is placed thereover in an inverted position.

A portion of the annular space between the cups may be packed around with cotton or other porous material.

The cap is then screwed fast, and the device being restored to its upright position, is screwed to its place on the top of the cask.

When it is desired to provide a relief to the diminished pressure occasioned by draught, the cock H is opened, so as to allow the air to enter, and after permeating the saturated cotton, to enter the inverted cup F, and to pass down the stand-pipe E and stem $b$ into the cask.

The moment the pressure within the cask exceeds that of the atmosphere, the valve I closes, and prevents the escape of gas and vapor from the cask.

By the above means I arrest all the detrimental parts of the atmosphere before their contact with the liquor.

I claim herein as new, and of my invention—

1. The mode of preserving liquor on tap from souring, by causing the entering air to traverse a purifying-liquid or material, substantially as set forth.

2. The cup or ventilator D, having the valve-guarded neck C, stand-pipe E, inverted cup F, and faucet H, or their equivalents, for the purposes explained.

In testimony of which invention, I hereunto set my hand.

JOHN G. CULLMANN.

Witnesses:
GEO. H. KNIGHT,
JAMES H. LAYMAN.